(12) United States Patent
Ruppel et al.

(10) Patent No.: US 8,439,022 B2
(45) Date of Patent: May 14, 2013

(54) VENTILATION DEVICE FOR A FORCED INDUCTION INTERNAL COMBUSTION ENGINE

(75) Inventors: Stefan Ruppel, Mannheim (DE); Mirko Braun, Calw (DE); Robert Dunsch, Vaihingen (DE); Yakup Ozkaya, Kornwestheim (DE)

(73) Assignee: Mahle International GmbH (DE)

( * ) Notice: Subject to any disclaimer, the term of this patent is extended or adjusted under 35 U.S.C. 154(b) by 763 days.

(21) Appl. No.: 12/298,157

(22) PCT Filed: Apr. 19, 2007

(86) PCT No.: PCT/EP2007/053816
§ 371 (c)(1),
(2), (4) Date: Aug. 18, 2009

(87) PCT Pub. No.: WO2007/122170
PCT Pub. Date: Nov. 1, 2007

(65) Prior Publication Data
US 2009/0320809 A1    Dec. 31, 2009

(30) Foreign Application Priority Data
Apr. 25, 2006 (DE) .......................... 10 2006 019 634

(51) Int. Cl.
*F02B 25/06* (2006.01)
(52) U.S. Cl.
USPC ............................ 123/572; 123/573; 123/574
(58) Field of Classification Search ........... 123/572–574
See application file for complete search history.

(56) References Cited

U.S. PATENT DOCUMENTS

| 4,901,703 | A* | 2/1990 | Humphries | 123/572 |
| 7,712,456 | B2* | 5/2010 | Hirano | 123/572 |
| 7,913,676 | B2* | 3/2011 | Breuninger et al. | 123/572 |
| 8,191,538 | B2* | 6/2012 | Braun et al. | 123/572 |
| 2001/0017033 | A1* | 8/2001 | McKinley et al. | 60/605.2 |
| 2002/0046743 | A1 | 4/2002 | Moren | |

(Continued)

FOREIGN PATENT DOCUMENTS

| DE | 8809973 | 9/1988 |
| DE | 19709910 | 9/1998 |

(Continued)

OTHER PUBLICATIONS

European Search Report for EP07728278.8.

(Continued)

*Primary Examiner* — Marguerite McMahon
*Assistant Examiner* — James Kim
(74) *Attorney, Agent, or Firm* — Rader, Fishman & Grauer PLLC

(57) ABSTRACT

The invention relates to a ventilation device (19) for an internal combustion engine (1) for evacuating blow-by gas from a crankcase (3), comprising a first line (20), which is connected at the one end to the crankcase (3) and at the other end, downstream of a forced induction device (10), to a fresh-gas line (7) and contains a ventilation valve (23), and a second line (21), which is connected at the one end, upstream of the forced induction device (10), to the fresh-gas line (7) and at the other end, between the crankcase (3) and the ventilation valve (23), to the first line (20) and contains a throttle device (23).

20 Claims, 3 Drawing Sheets

U.S. PATENT DOCUMENTS

Figure 1:
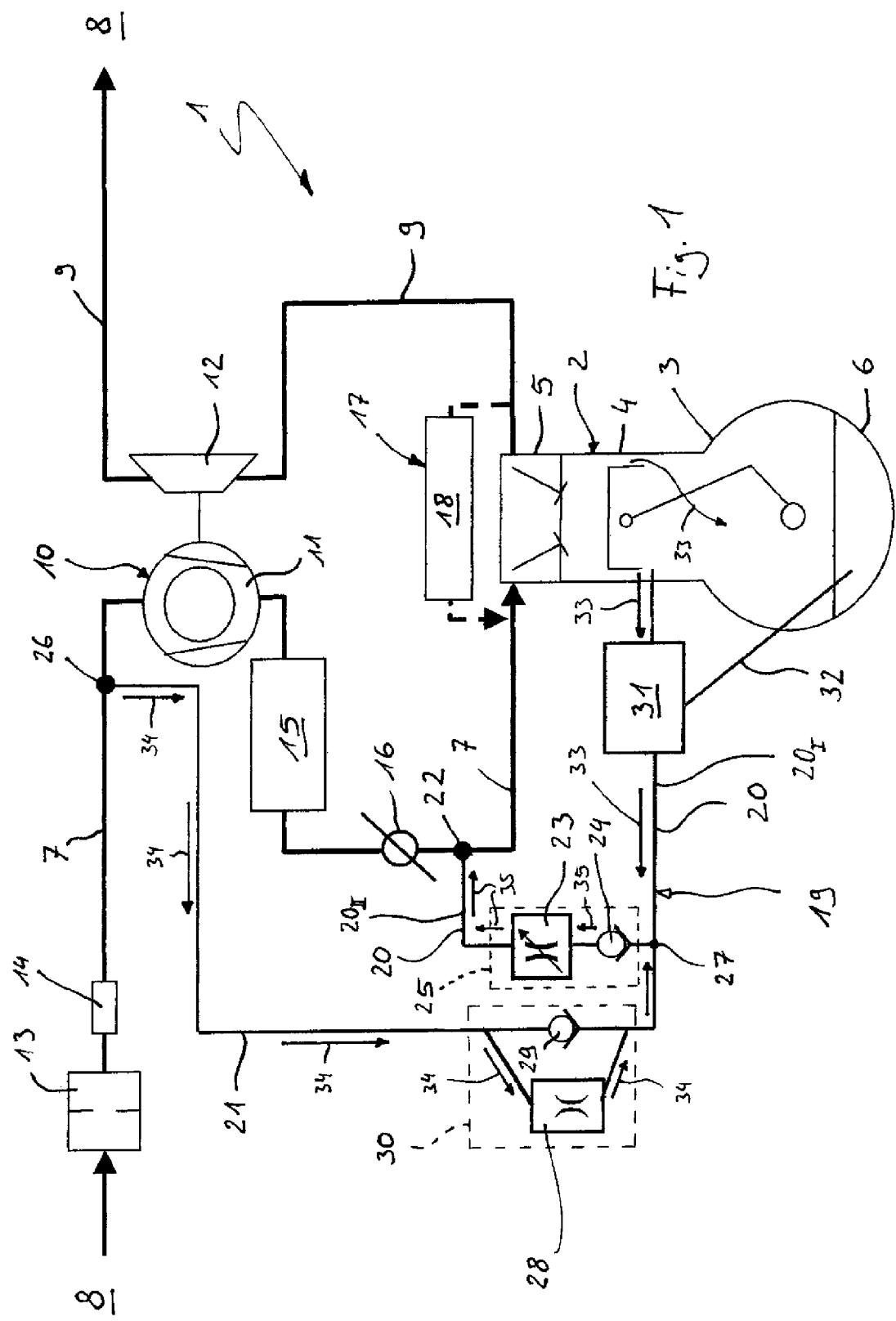

| | | | |
|---|---|---|---|
| 2003/0140909 A1* | 7/2003 | Criddle et al. | 123/572 |
| 2004/0112346 A1* | 6/2004 | Ahlborn et al. | 123/572 |
| 2004/0139734 A1* | 7/2004 | Schmeichel et al. | 60/283 |
| 2005/0000496 A1* | 1/2005 | Norrick | 123/563 |
| 2005/0061305 A1* | 3/2005 | Pietschner | 123/572 |
| 2006/0196482 A1* | 9/2006 | Kakimoto et al. | 123/519 |

FOREIGN PATENT DOCUMENTS

| | | |
|---|---|---|
| EP | 0220886 | 12/1990 |
| JP | 55043221 | 3/1980 |
| JP | 55043221 A | 3/1980 |
| JP | 60209619 | 10/1985 |
| JP | 04292516 | 10/1992 |
| JP | 5-87213 | 11/1993 |
| JP | 60-81416 A | 3/1994 |

OTHER PUBLICATIONS

English abstract for JP-60209619.
European Office Action for EP 07728278.8.
English abstract for 60-81416.
English Abstract for JP-04292516.
English Abstract for JP-55043221.
International Search Report.

\* cited by examiner

VENTILATION DEVICE FOR A FORCED INDUCTION INTERNAL COMBUSTION ENGINE

CROSS-REFERENCES TO RELATED APPLICATION

This application is a National Stage application which claims the benefit of International Application No. PCT/DE2007/053816 filed Apr. 19, 2007, which claims priority based on German Patent Application No. DE 10 2006 019 634.1, filed Apr. 25, 2006, both of which are hereby incorporated by reference in their entirety.

The present invention relates to a deaerating device for a supercharged internal combustion engine, in particular in a motor vehicle, for removing blow-by gas out of a crankcase of the internal combustion engine.

In internal combustion engines which are designed as piston engines, so-called blow-by gases enter the crankcase of the internal combustion engine from the combustion chambers of the engine during operation. The amount of blow-by gases produced depends on the operating state of the internal combustion engine, e.g., idling or full load. To avoid an unacceptably high excess pressure in the crankcase, the blow-by gases must be removed from the crankcase. However, emission of the blow-by gases into the environment is undesirable for reasons of environmental protection.

Accordingly, a deaerating device usually comprises a line which is connected to the crankcase at one end and is connected to a fresh gas line of the internal combustion engine at the other end. The blow-by gases are thus again supplied to the internal combustion engine for combustion. To be able to prevent emission of blow-by gases into the environment, it is expedient to have suction exhaust of blow-by gases from the crankcase in such a way that a vacuum is established in the crankcase. Such a vacuum is regularly available in the fresh air line at least in intake engines, in particular downstream from a throttle valve. However, in certain operating states, vacuums may occur in the fresh gas line to such an extent that they can result in destruction of the crankcase. With the help of vacuum regulating valves, an attempt is made to adjust the vacuum in the crankcase at a predetermined level.

In supercharged engines, additional problems occur due to the fact that introduction of the blow-by gases upstream from the respective supercharging device is undesirable per se to prevent soiling of same. However, a sufficient vacuum is available on the pressure side of the supercharging device only when the internal combustion engine is operating in idling mode or in a lower partial load range.

A deaerating device of the type defined in the introduction preferably comprises a first line, which is connected at one end to the crankcase and is connected at the other end to the fresh gas line downstream from the supercharging device. The first line contains a deaerating valve, usually a vacuum regulating valve that is designed so that, beyond a predetermined limit value of a pressure difference applied to it, it limits a volume flow leading to the fresh gas line to a predetermined target value. The deaerating device may usually also have a second line, which is connected at one end to the fresh gas line upstream from the supercharging device and at the other end is also connected to the crankcase. This second line contains a throttle device, which is designed so that it adjusts a volume flow leading to the crankcase at a predetermined target value in the case of a predetermined value of a pressure difference applied thereto.

In idling operation of the internal combustion engine, a relatively strong vacuum prevails at the connection between the first line and the fresh gas line, in particular when it is located downstream from a throttle valve, so that a relatively large amount of blow-by gas can be dissipated from the crankcase. However, only a comparatively small amount of blow-by gas is formed in idling operation. The second line allows deaerating to the crankcase for this operating case by supplying fresh air drawn in upstream from the supercharging device to the crankcase, thereby preventing an unnecessarily great vacuum in the crankcase.

With an increasing partial load, the vacuum at the connection of the first line drops, while at the same time the amount of blow-by gas to be removed increases in the crankcase. Accordingly, the amount of fresh air supplied through the second line also drops. Beyond a certain partial load, the vacuum prevailing at the connection of the first line is no longer sufficient to adjust the desired vacuum in the crankcase. Then the vacuum at the connection of the first line becomes smaller than the vacuum at the connection of the second line. Consequently, the direction of flow in the second line is reversed so that it now ensures deaerating of the crankcase. The first line may expediently be equipped with a non-return cutoff device, so that the first line is automatically blocked in the direction of the crankcase when the pressure in the fresh gas line at the connection of the first line increases further.

With a further increase in partial load or in full load, an excess pressure prevails in the fresh gas line downstream from the supercharging device. The first line is then blocked and the blow-by gases are removed exclusively via the second line.

In certain operating states of the internal combustion engine, in particular at full load, the vacuum available upstream from the supercharging device in the fresh gas line is comparatively small, so that a sufficient suction exhaust of the blow-by gases is not always ensured. This intensifies the problems in particular when the connection of the second line must be positioned comparatively close to the inlet of the supercharging device, e.g., for reasons of design space.

Furthermore, a separation device for removing oil and/or oil droplets from the blow-by gas including the respective oil return line must also be provided for the second line to be able to introduce the blow-by gases from which the oil has been removed into the fresh gas line through the second line in deaerating.

The present invention relates to the problem of providing an improved embodiment for a deaerating device of the type defined in the introduction, which is characterized in particular by reduced manufacturing costs.

This problem is solved according to the present invention by the subject matter of the independent claim. Advantageous embodiments are the subject matter of the dependent claim.

The invention is based on a general idea of connecting the second line not to the crankcase but instead connecting it to the first line between the crankcase and the deaerating valve. The deaerating valve of the first line and the throttle device of the second line are coordinated with one another, so that in operating states with introduction of the blow-by gas into the fresh gas line through the second line downstream from the supercharging device, approximately as much fresh gas is always added to the blow-by gas, so that reliable deaerating of the crankcase is ensured on the one hand, while on the other hand the buildup of an unacceptably high vacuum in the crankcase is prevented. In operating states with introduction of blow-by gas into the fresh gas line upstream from the supercharging device, the blow-by gases are exhausted through the part of the first line leading from the crankcase to the connection point of the second line and are removed through the second line downstream from this connection. In this way, the second line utilizes said part of the first line including a separation device with an oil return optionally arranged therein. Subsequently, a second separation device assigned to the second line and having an oil return may be omitted, thereby reducing the complexity required to implement the deaerating device.

Other important features and advantages of the invention are derived from the dependent claims, the drawings and the respective description of the figures on the basis of the drawings.

It is self-evident that the features mentioned above and those yet to be explained below may be used not only in the particular combination given but also in other combinations or alone without going beyond the scope of the present invention.

Preferred exemplary embodiments of the invention are depicted in the drawings and are explained in greater detail in the following description, where the same reference numerals refer to the same or similar or functionally identical components.

Figure 2:
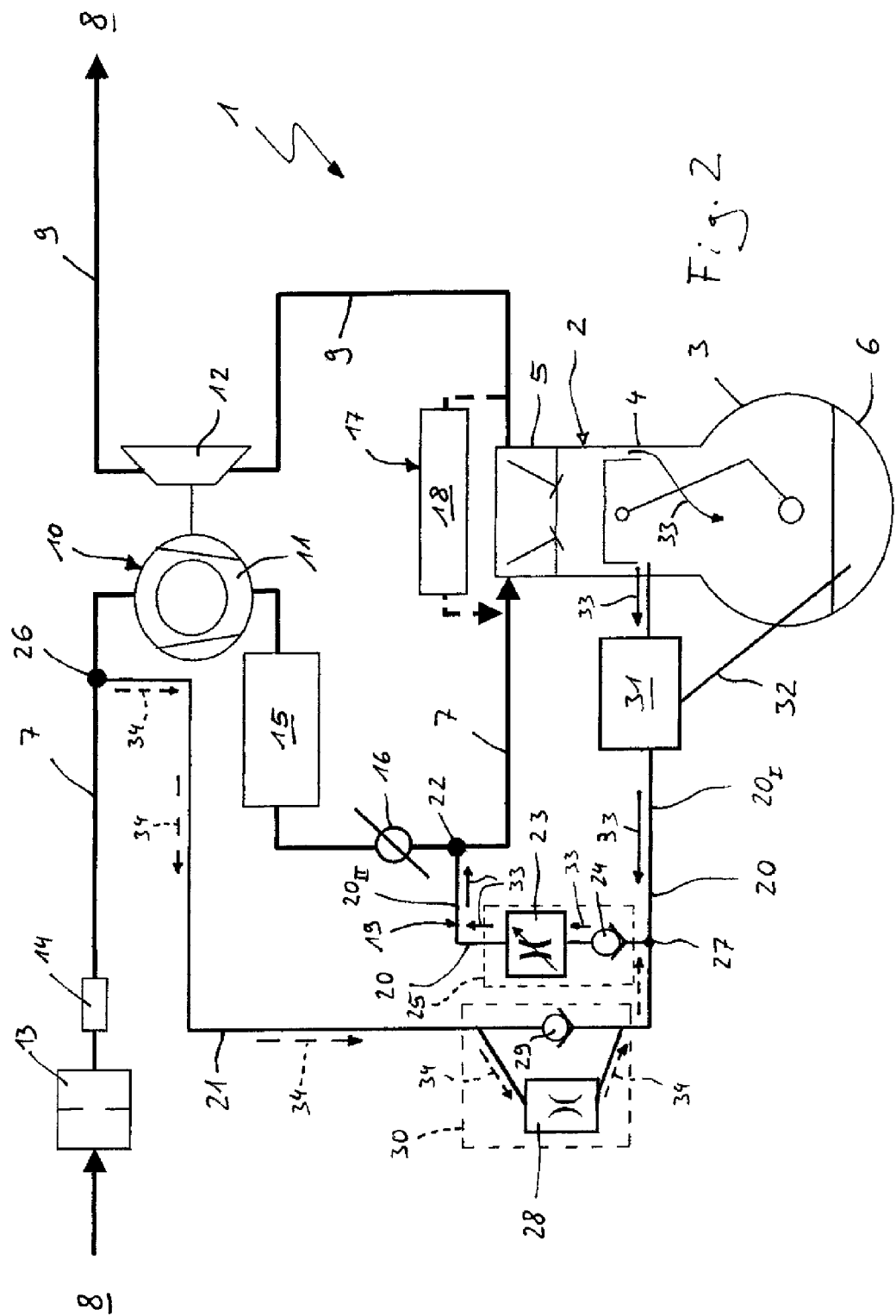
Figure 3:
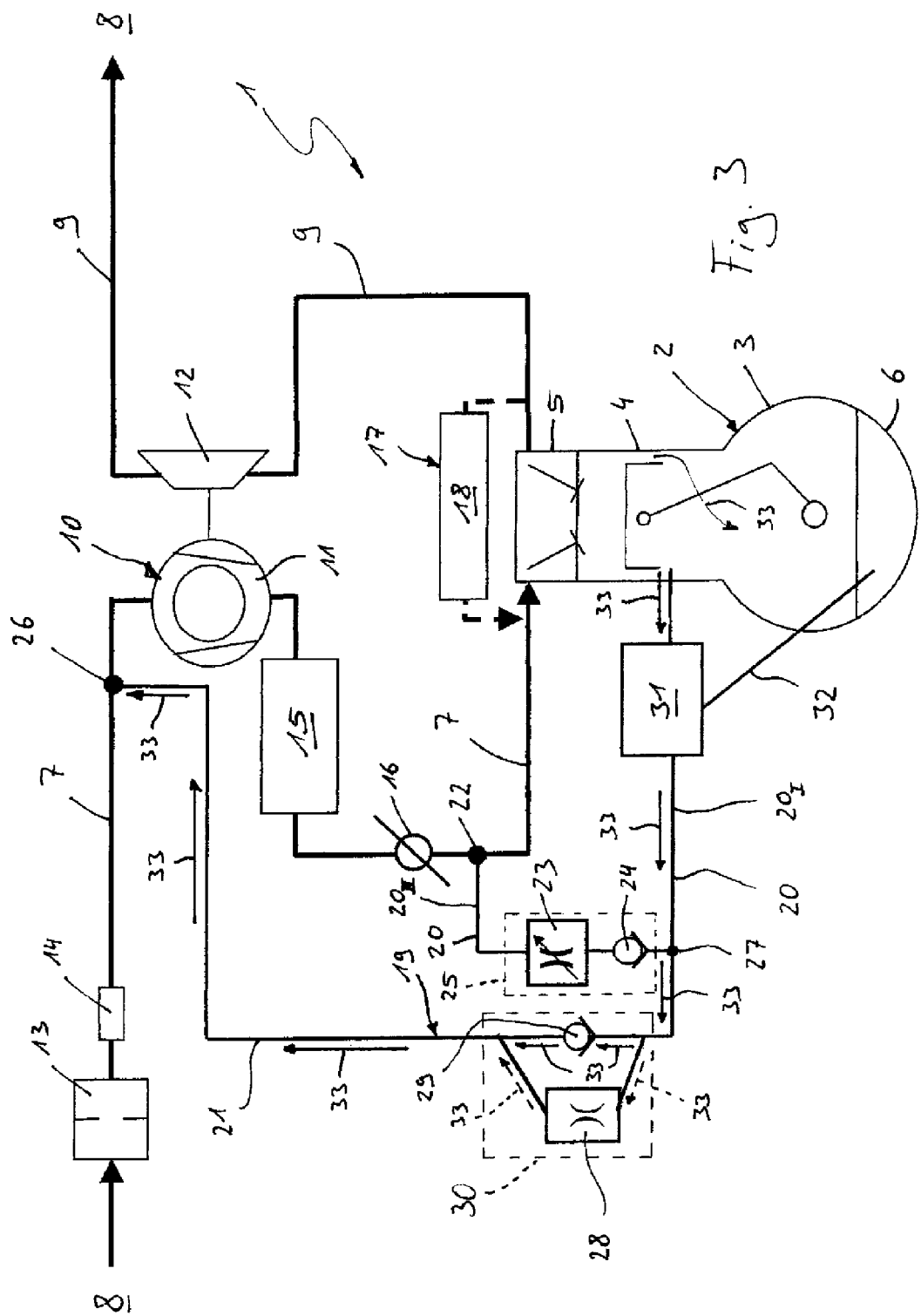

The drawings show schematically in each:

FIGS. 1 to 3 each show a greatly simplified basic diagram like a wiring diagram of a deaerating device in different operating states.

According to FIGS. 1 to 3, an internal combustion engine 1 comprises an engine block 2 with a crankcase 3, a cylinder head 4, a rocker cover 5 and an oil pan 6. A fresh gas line 7 carries fresh gas from an environment 8 to the engine block 2, while an exhaust gas line 9 removes exhaust gas of the internal combustion engine 1 from the engine block 2 and emits it into the environment 8. The internal combustion engine 1 is preferably installed in a motor vehicle. The internal combustion engine 1 is supercharged and accordingly has a supercharging device 10, which is designed as an exhaust gas turbocharger, for example, in the present case. Accordingly, the supercharging device 10 has a compressor 11, which is installed in the fresh gas line 7 as well as a turbine 12, which is installed in the exhaust line 9. It is clear that the internal combustion engine 1 may also be equipped with a different supercharging device 10 such as a mechanical supercharger, in particular a Roots blower.

The fresh gas line 7 contains an air filter 13 at the inlet end and, downstream from that, an air flow metering device 14, which is designed as a hot-film air mass meter, for example. Downstream from the supercharging device 10, the fresh gas line 7 contains a supercharging air cooler 15 and downstream from that a throttle valve 16.

In addition, the internal combustion engine 1 is equipped with an exhaust gas recirculation device 17, which is shown here in simplified form and is represented only by an exhaust gas recirculation cooler 18.

Furthermore, the internal combustion engine 1 is equipped with a deaerating device 19 with the help of which blow-by gas can be dissipated from the crankcase 3 during operation of the internal combustion engine 1. Such blow-by gas enters the crankcase 3 during operation of the internal combustion engine 1 because of leakage from cylinder spaces, which are not identified further, in the engine block 2.

The deaerating device 19 comprises a first line 20 and a second line 21. The first line 20 is connected to the crankcase 3 at one end and to the fresh gas line 7 at the other end via a first connection point 22. The first connection point 22 is situated downstream from the supercharging device 10 and in particular downstream from the throttle valve 16. At the same time, the first connection point 22 is positioned within the fresh gas line 7 upstream from an introduction point, which is not identified further, in the exhaust gas recirculation device 17. The first line 20 contains a deaerating valve 23, which may be designed more or less as a vacuum regulating valve. The deaerating valve 23 is designed, so that it limits a volume of flow leading to the fresh gas line 7 to a predetermined target value beyond a predetermined limit value of a pressure difference applied thereto.

In the examples shown here, a nonreturn cutoff device 24 is also arranged in the first line 20, blocking it in the direction to the crankcase 3 and being active in the direction to the deaerating valve 23. The nonreturn cutoff device 24 is preferably integrated into the deaerating valve 23, forming a uniform module 25, which is formed by a deaerating valve having an integrated nonreturn cutoff function.

The second line 21 is connected at one end to the fresh gas line 7 at a second connection point 26, which is located upstream from the supercharging device 10, whereas at the other end it is connected to the first line 20 at a third connection point 27. The third connection point 27 is situated between the crankcase 3 and the deaerating valve 23. If the nonreturn cutoff device 24 and/or the module 25 is present, it is situated between the first connection point 22 and the third connection point 27.

The second line 21 contains a throttle device 28, which is designed so that it adjusts a volume flow leading to the first line 20 at a predetermined target value for a predetermined value of a pressure difference applied to it. With the preferred embodiment shown here, the second line 21 may also be equipped with a nonreturn cutoff valve 29 which has a blocking effect in the direction of the first line 20. The nonreturn cutoff valve 29 and the throttle device 28 are arranged here so the flow can pass through them in parallel, with the throttle device 28 forming a bypass which bypasses the nonreturn cutoff valve 29, the bypass also being labeled below as 28. The nonreturn cutoff valve 29 and the throttle device 28 may preferably also form an integral component 30. This component 30 is formed in particular by the nonreturn cutoff valve 29 with the integrated bypass 28. The first line 20 is subdivided by the third connection point 27 into a first line part $20_I$ extending from the crankcase 3 to the third connection point 27 and a second line part $20_{II}$ extending from the first connection point 22 to the third connection point 27. In the first line part $20_I$ the first line 20 contains a separation device 31, which is designed to remove oil and/or oil droplets from the blow-by gas exhausted from the crankcase 3 during operation of the internal combustion engine 1. The oil thereby separated can be returned via a return line 32 from the separation device 31 into the crankcase 3, preferably into the oil pan 6.

The inventive deaerating device 19 operates as follows:

In a first operating state as shown in FIG. 1, the internal combustion engine 1 operates in idling operation, i.e., in an operating state with minimal load. In this operating state, comparatively little blow-by gas enters the crankcase 3. At the same time, the supercharging device 10 is essentially inactive; at least the throttle valve 16 produces a strong throttling effect so that downstream from the throttle valve 16 a comparatively great vacuum prevails in the fresh gas line 7. This vacuum is so great that it is above the limit value of the deaerating valve 23 and above the certain value upstream from the throttle device 28. Accordingly, the deaerating valve 23 allows the predetermined volume flow to pass through it. At the same time, the throttle device 28 also allows a volume flow to pass through, but it is smaller than the predetermined volume flow of the deaerating valve 23. The deaerating valve 23 and the throttle device 28 are coordinated with one another in a targeted manner, so that in this operating case with a minimal amount of blow-by gas to be removed out of the crankcase 3, precisely enough blow-by gas is drawn out of the crankcase 3 so that a predetermined vacuum can be established in the crankcase 3. In particular, the vacuum in the crankcase 3 should not drop to an unlimited extent in this operating state. Accordingly, in this operating state, the volume flow removed into the fresh gas line 7 through the second line part $20_{II}$ is formed in part by the amount of blow-by gas to be removed, which is withdrawn from the crankcase 3 through the first line part $20_I$, and the remainder is formed by a corresponding amount of fresh gas, which is withdrawn from the fresh gas line 7 upstream from the supercharging device 10 through the second line 21.

With increasing load on the internal combustion engine 1, the amount of blow-by gas produced in the crankcase 3 also increases, so that more blow-by gas must be removed accordingly. Due to the throttling effect of the throttle device 28, the volume flow of the fresh gas mixed with the blow-by gas also decreases accordingly at the same time.

The blow-by gas stream is symbolized by arrows 33 in FIG. 1. The fresh gas stream is symbolized by arrows 34 in FIG. 1 and the mixed stream comprised of blow-by gas and fresh gas is symbolized by arrows 35 in FIG. 1.

FIG. 2 shows an operating state of the internal combustion engine 1 at partial load, at which only a comparatively small vacuum prevails at the first connection point 22 in the fresh gas line 7, this vacuum being just great enough so that the total quantity of blow-by gas produced can still be removed from the crankcase 3 through the first line 20 and introduced into the fresh gas line 7. Especially suitable for this is a deaerating valve 23, which is characterized by a characteristic line in which with an increasing pressure difference, the volume flow pressing through the deaerating valve 23 increases at first (linearly), then at a moderate pressure difference reaches a maximum for the volume flow and with an increasing pressure difference up to a predetermined target value falls (linearly), this target value then remaining constant with any further increase in pressure difference. Said maximum is expediently in the range of a pressure difference which is applied to the deaerating valve 23 in the operating state of the internal combustion engine 1 shown in FIG. 2. In this operating state, the amount of fresh gas added to the blow-by gas through the second line 21 is very small and may even drop back to a value of zero. For the same of illustration, the flow arrows for the fresh gas stream 34 are depicted with interrupted lines.

Since the fresh gas flow 34 in this operating state is more or less negligible, the blow-by gas flow 33 here is also present in the second partial $20_{II}$.

With increasing load, in particular at full load, the state depicted in FIG. 3 is established. First, the vacuum established at the first connection point 22 is too low to be able to remove the amount of blow-by gas thereby generated. Secondly, at the first connection point 22, in particular due to the operation or activation of the supercharging device 10 in combination with a corresponding throttle valve setting, an excess pressure may build up, making it impossible to introduce blow-by gas through the first connection point 22 into the fresh gas line 7. The nonreturn cutoff device 24 blocks the line at the first connection point 22 when there is an excess pressure.

With an increase in pressure on the pressure side of the supercharging device 10, the pressure on the suction side of the supercharging device 10 drops. Consequently, there develops a vacuum at the second connection point 26 which is sufficient to remove any blow-by gases formed in the crankcase 3. This is fundamentally possible via the throttle device 28, which is indicated here by flow arrows, shown with interrupted lines. However, in this direction of flow, the nonreturn cutoff valve 29 opens so that the blow-by gas flow 33, or at least most of it, flows through the nonreturn cutoff valve 29.

The nonreturn cutoff valve 29 is preferably designed so that its opening resistance and its flow-through resistance are lower than the flow-through resistance of the by-pass and/or the throttle device 28. In particular the opening resistance and the flow-through resistance of the nonreturn cutoff valve 29 are selected so that the vacuum prevailing at the second connection point 26 is sufficient to exhaust the amount of blow-by gas formed in this operating state or state range out of the crankcase 3. In this way, a predetermined vacuum can be set in the crankcase 3. The second line 21 is more or less dethrottled in the opening direction of the nonreturn cutoff valve 29 because of the very small resistances for opening and flow-through of the nonreturn cutoff valve 29 so that it is possible in particular to position the second connection point 26 relatively close to an inlet of the supercharging device 10.

It is noteworthy here that blow-by gas flows through the first line part even with blow-by gas introduced through the second connection point 26, i.e., upstream from the supercharging device 10 of the first line part $20_I$ of the first line 20. Accordingly, the separator device 31 arranged therein is also utilized in this operating situation. An additional separating device assigned exclusively to the second line 21 is therefore dispensable.

Furthermore, it is noteworthy that the inventive deaerating device 19 operates without aeration of the crankcase 3 in all operating ranges of the internal combustion engine 1. This makes it possible to eliminate measures for aerating the crankcase 3.

The invention claimed is:

1. A deaerating device for a supercharged internal combustion engine, in particular in a motor vehicle, for removing blow-by gas from a crankcase of the internal combustion engine, comprising:
    a first line, which is selectively connected to the crankcase at one end and which is selectively connected at the other end to a fresh gas line of the internal combustion engine downstream from a supercharging device of the internal combustion engine, and which contains a deaerating valve that is designed so that it limits a volume flow leading to the fresh gas line to a predetermined target value beyond a predetermined limit value of a pressure difference applied thereto; and
    a second line which is selectively connected to the fresh gas line at one end upstream from the supercharging device and which is connected to the first line at the other end between the crankcase and the deaerating valve and which contains a throttle device that is designed so that it adjusts a volume flow leading to the first line at a predetermined target value, when the applied pressure difference reaches a predetermined value.

2. The deaerating device according to claim 1, characterized in that the second line contains a nonreturn cutoff valve from the fresh gas line to the first line in parallel with the throttle device so that the throttle device forms a bypass, which bypasses the nonreturn cutoff valve, and at least one of the bypass and the throttle device are integrated into the nonreturn cutoff valve.

3. The deaerating device according to claim 2, characterized in that
    an opening resistance and a flow-through resistance of the nonreturn cutoff valve are lower than a flow-through resistance of one of the bypass and the throttle device, and an opening resistance and a flow-through resistance of the nonreturn cutoff valve are selected so that in full load operation of the internal combustion engine, the vacuum prevailing at a connection point at which the second line is connected to the fresh gas line is sufficient to set one of a predetermined vacuum in the crankcase and to evacuate a predetermined amount of blow-by gas.

4. The deaerating device according to claim 1 characterized in that
the first line contains a nonreturn cutoff valve between the fresh gas line and a connection point at which the second line is connected to the first line, this nonreturn cutoff device cutting off the flow from the fresh gas line to the connection point.

5. The deaerating device according to claim 4, characterized in that the nonreturn cutoff device is integrated into the deaerating valve.

6. The deaerating device according to claim 1, characterized in that
the deaerating valve and one of the bypass and the throttle device are coordinated with one another so that in idling operation of the internal combustion engine, one of the pressure drop in the crankcase is limited to a predetermined vacuum and the blow-by gas evacuation from the crankcase is limited to a predetermined volume flow.

7. The deaerating device according to claim 1, characterized in that
the deaerating device operates in all operating ranges of the internal combustion engine without aeration of the crankcase.

8. The deaerating device according to claim 1, characterized in that at least one of (i) the first line is connected to the fresh gas line downstream from a supercharging air cooler, (ii) the first line is connected to the fresh gas line downstream from a throttle valve and (iii) the first line is connected to the fresh gas line upstream from an introduction point of an exhaust gas recirculation device.

9. The deaerating device according to claim 1, characterized in that the second line is connected to the fresh gas line downstream from at least one of an air flow meter and an air filter (13).

10. The deaerating device according to claim 1, characterized in that
the second line is connected to the first line between the deaerating valve and a separation device arranged in the first line for removing at least one of oil and oil droplets from the blow-by gas.

11. The deaerating device according to claim 2, characterized in that an opening resistance and a flow-through resistance of the nonreturn cutoff valve are lower than a flow-through resistance of one of the bypass and the throttle device.

12. The deaerating device according to claim 2, characterized in that an opening resistance and a flow-through resistance of the nonreturn cutoff valve are selected so that in full load operation of the internal combustion engine, the vacuum prevailing at a connection point at which the second line is connected to the fresh gas line is sufficient to set one of a predetermined vacuum in the crankcase and to evacuate a predetermined amount of blow-by gas.

13. The deaerating device according to claim 2, characterized in that the first line contains a nonreturn cutoff valve between the fresh gas line and a connection point at which the second line is connected to the first line, this nonreturn cutoff device cutting off the flow from the fresh gas line to the connection point.

14. The deaerating device according to claim 2, characterized in that the deaerating valve and one of the bypass and the throttle device are coordinated with one another so that in idling operation of the internal combustion engine, one of the pressure drop in the crankcase is limited to a predetermined vacuum and the blow-by gas evacuation from the crankcase is limited to a predetermined volume flow.

15. The deaerating device according to claim 2, characterized in that the deaerating device operates in all operating ranges of the internal combustion engine without aeration of the crankcase.

16. The deaerating device according to claim 3, characterized in that the deaerating valve and one of the bypass and the throttle device are coordinated with one another so that in idling operation of the internal combustion engine, one of the pressure drop in the crankcase is limited to a predetermined vacuum and the blow-by gas evacuation from the crankcase is limited to a predetermined volume flow.

17. The deaerating device according to claim 3, characterized in that the deaerating device operates in all operating ranges of the internal combustion engine without aeration of the crankcase.

18. The deaerating device according to claim 1, characterized in that the first line is connected to the fresh gas line downstream from a supercharging air cooler and the first line is connected to the fresh gas line upstream from an introduction point of an exhaust gas recirculation device.

19. The deaerating device according to claim 1, characterized in that the first line is connected to the fresh gas line downstream from a throttle valve and the first line is connected to the fresh gas line upstream from an introduction point of an exhaust gas recirculation device.

20. The deaerating device according to claim 1, characterized in that the first line is connected to the fresh gas line downstream from a supercharging air cooler and a throttle valve, and the first line is connected to the fresh gas line upstream from an introduction point of an exhaust gas recirculation device.

* * * * *